United States Patent
Lee

(10) Patent No.: US 12,512,132 B2
(45) Date of Patent: Dec. 30, 2025

(54) STORAGE SYSTEM AND SEMICONDUCTOR PACKAGE WITH IMPROVED POWER SUPPLY EFFICIENCY

(71) Applicant: SK hynix Inc., Icheon-si (KR)

(72) Inventor: Dong Sop Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 192 days.

(21) Appl. No.: 18/204,806

(22) Filed: Jun. 1, 2023

(65) Prior Publication Data

US 2024/0242742 A1  Jul. 18, 2024

(30) Foreign Application Priority Data

Jan. 12, 2023  (KR) .......................... 10-2023-0004482

(51) Int. Cl.
*G11C 5/14* (2006.01)

(52) U.S. Cl.
CPC .................................. *G11C 5/147* (2013.01)

(58) Field of Classification Search
None
See application file for complete search history.

(56) References Cited

U.S. PATENT DOCUMENTS

| | | | | |
|---|---|---|---|---|
| 6,434,044 B1* | 8/2002 | Gongwer | ............... | G11C 5/14 365/185.11 |
| 6,798,709 B2* | 9/2004 | Sim | .................... | G11C 11/4074 365/189.11 |
| 7,702,935 B2* | 4/2010 | Cornwell | ................... | G06F 1/26 713/320 |
| 7,768,863 B1* | 8/2010 | Dewey | ..................... | G06F 1/26 307/86 |
| 7,948,809 B2* | 5/2011 | Miki | ........................ | G05F 1/56 365/189.09 |
| 9,013,943 B2* | 4/2015 | Masleid | .................... | G11C 5/14 365/228 |
| 2003/0099145 A1* | 5/2003 | Clark | ........................ | G11C 7/02 365/226 |
| 2005/0219903 A1* | 10/2005 | Daga | ........................ | G11C 5/14 365/185.18 |
| 2007/0008801 A1* | 1/2007 | Chiang | ..................... | G11C 5/14 713/300 |

(Continued)

FOREIGN PATENT DOCUMENTS

| KR | 20150062764 A | 6/2015 |
|---|---|---|
| KR | 20210040173 A | 4/2021 |

*Primary Examiner* — Amir Zarabian
(74) *Attorney, Agent, or Firm* — Perkins Coie LLP

(57) ABSTRACT

Data storage systems and semiconductor devices are disclosed. In an embodiment, a storage system includes a circuit board, a semiconductor device coupled to the circuit board and including at least one memory and a controller, wherein the controller is in communication with the at least one memory and configured to control the at least one memory, and a voltage level regulator coupled to the circuit board and including at least one switching element and located outside the at least one memory and the controller in the semiconductor device, the voltage level regulator configured to output, to at least one of the at least one memory or the controller, a driving voltage obtained by adjusting a level of at least one external voltage received from a device outside the semiconductor device.

17 Claims, 10 Drawing Sheets

(56) References Cited

U.S. PATENT DOCUMENTS

| | | | | |
|---|---|---|---|---|
| 2008/0080254 A1* | 4/2008 | Kagan | G11C 5/147 | 365/185.23 |
| 2008/0080255 A1* | 4/2008 | Kagan | G11C 5/147 | 365/185.23 |
| 2008/0273391 A1* | 11/2008 | Steedman | G11C 5/147 | 365/185.33 |
| 2011/0110173 A1* | 5/2011 | Chang | G11C 5/143 | 711/E12.001 |
| 2011/0158027 A1* | 6/2011 | Kwon | G11C 5/145 | 327/539 |
| 2011/0235457 A1* | 9/2011 | Hirata | G11C 5/147 | 365/226 |
| 2011/0310690 A1* | 12/2011 | Huang | G11C 5/147 | 365/226 |
| 2012/0099392 A1* | 4/2012 | Shim | G11C 5/147 | 365/226 |
| 2013/0223161 A1* | 8/2013 | Arsovski | G11C 5/147 | 365/189.06 |
| 2014/0347946 A1* | 11/2014 | Plavec | G11C 5/147 | 323/234 |
| 2023/0206961 A1* | 6/2023 | Huang | G11C 5/148 | 365/226 |

\* cited by examiner

Square

Hexagonal

Octagonal

Circular

STORAGE SYSTEM AND SEMICONDUCTOR PACKAGE WITH IMPROVED POWER SUPPLY EFFICIENCY

CROSS-REFERENCE TO RELATED APPLICATION

This patent document claims the priority and benefits of Korean patent application number 10-2023-0004482 filed on Jan. 12, 2023, which is incorporated herein by reference in its entirety.

TECHNICAL FIELD

The embodiments of the disclosed technology relate to a data storage system and semiconductor device with improved power supply efficiency.

BACKGROUND

A data storage device may include a plurality of memory cells for storing data according to a command from an external host device. In addition, the data storage device may include a controller for controlling operations of a plurality of memory cells. The controller may control read, write, and/or erase operations on memory cells according to a command input from the host device.

A memory cell and a controller included in a data storage device may receive a voltage that can be used for operations of the memory cell and the controller from an external power supply. Since the voltage level used in the data storage device varies, the externally supplied voltage may be difficult to satisfy all the voltage levels required by the storage device.

SUMMARY

The disclosed technology can be implemented in some embodiments to provide a configuration capable of improving power supply efficiency by supplying a voltage at a level for operating a data storage device using a voltage applied from the outside of the storage device.

In an aspect, a storage system includes a circuit board, a semiconductor device coupled to the circuit board and including at least one memory and a controller, wherein the controller is in communication with the at least one memory and configured to control the at least one memory, and a voltage level regulator coupled to the circuit board and including at least one switching element and located outside the at least one memory and the controller in the semiconductor device, the voltage level regulator configured to output, to at least one of the at least one memory or the controller, a driving voltage obtained by adjusting a level of at least one external voltage received from a device outside the semiconductor device.

In another aspect, a semiconductor device includes at least one memory, a controller configured to control the at least one memory, and a voltage level regulator including at least one switching element and located outside the at least one memory and the controller, the voltage level regulator configured to output, to at least one of the at least one memory or the controller, a driving voltage obtained by adjusting a level of at least one external voltage received from a device outside the semiconductor device.

In another aspect, a storage system includes a circuit board, a semiconductor device disposed on the circuit board and including at least one memory and a controller controlling the at least one memory, and a voltage level regulator, which is located outside the at least one memory and the controller in the semiconductor device and includes at least one switching element, configured to output a driving voltage obtained by adjusting a level of at least one external voltage input from an outside to at least one of the at least one memory or the controller.

In another aspect, a semiconductor device includes at least one memory, a controller configured to control the at least one memory, and a voltage level regulator, which is located outside the at least one memory and the controller and includes at least one switching element, configured to output a driving voltage obtained by adjusting a level of at least one external voltage input from an outside to at least one of the at least one memory or the controller.

The disclosed technology can be implemented in some embodiments to provide voltages at various levels used for operation of the storage device by using a fixed level voltage input from the outside of the storage device and to improve the usage efficiency of power supplied to the storage device.

DETAILED DESCRIPTION

Figure 1:
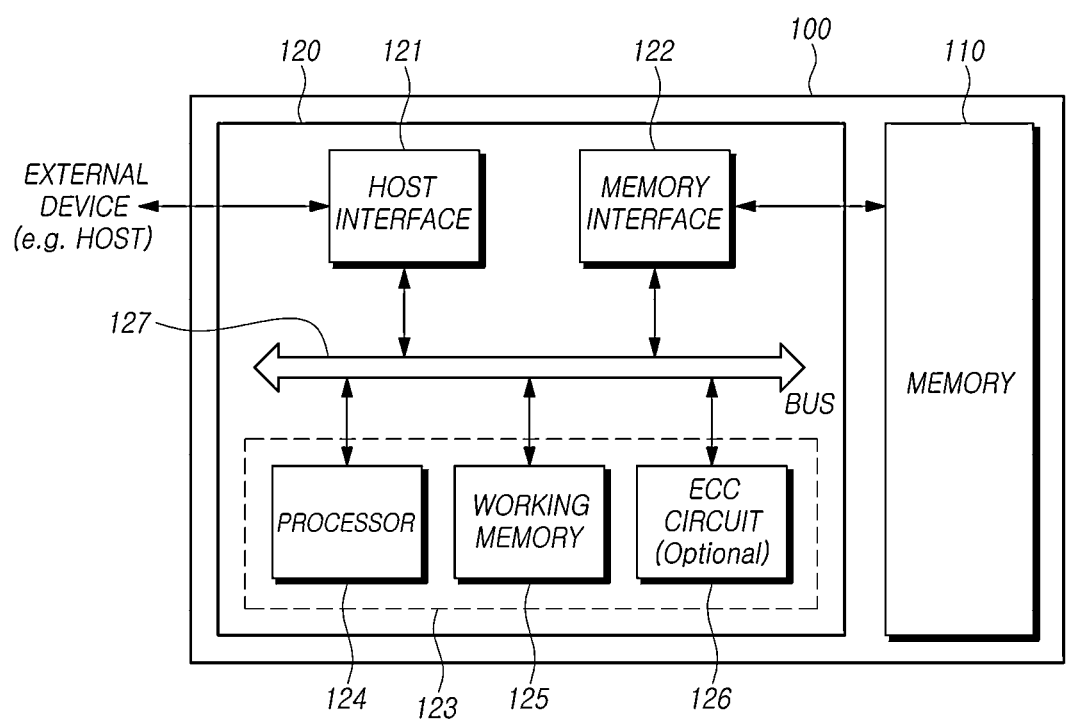
FIG. 1 is a schematic diagram illustrating an example configuration of a storage device based on some embodiments of the disclosed technology.

FIG. 1 is a schematic diagram illustrating a configuration of a storage device 100 based on some embodiments of the disclosed technology.

Referring to FIG. 1, a storage device 100 based on some example embodiments may include a memory 110 for storing data and a controller 120 for controlling the memory 110. In some implementations, the storage device 100 may include a data storage device that is configured to store data.

The memory 110 may include a plurality of memory blocks and may operate in response to control of the controller 120. The operation of the memory 110 may include, for example, a read operation, a program operation (e.g., a write operation), and an erase operation.

The memory 110 may include a memory cell array including a plurality of memory cells (or "cell") storing data. Such a memory cell array may exist in a memory block.

For example, the memory 110 may be implemented in a variety of types of a NAND flash memory, a 3D NAND flash memory, a NORA flash memory, a resistive RAM, a phase change memory, a magneto-resistive memory, a ferroelectric memory, or a spin injection magnetization inversion memory.

In some implementations, the memory 110 may be implemented in a three-dimensional array structure. In one example, the memory 110 may include a flash memory that includes a conductive floating gate as a charge storage layer. In another example, the memory 110 may include a charge-trap type flash memory that includes an insulating film as a charge storage layer.

The memory 110 may receive a command and an address from the controller 120 and access an area selected by the address in the memory cell array. The memory 110 may perform an operation indicated by a command on the area selected by the address.

For example, the memory 110 may perform a program operation, a read operation, and an erase operation.

When performing a program operation, the memory 110 may write (or program) data in an area selected by an address. When performing a read operation, the memory 110 may read data from an area selected by an address. When performing the erase operation, the memory 110 may erase data stored in an area selected by an address.

The controller 120 may control write (program), read, erase, and background operations of the memory 110. The background operations may include, for example, one or more of garbage collection (GC), wear leveling (WL), read reclaim (RR), or bad block management (BBM) operations.

The controller 120 may control the operation of the memory 110 according to a request of a device (e.g., a host HOST) located outside the storage device 100. In addition, the controller 120 may control the operation of the memory 110 regardless of a request from the host HOST.

The host may be a computer, UMPC (Ultra Mobile PC), workstation, PDA (Personal Digital Assistants), tablet, mobile phone, smartphone, e-book, PMP (Portable Multimedia Player), portable game device, a navigation device, a black box, a digital camera, a DMB (Digital Multimedia Broadcasting) players, smart televisions, digital voice recorders, digital voice players, digital video recorders, digital video players, digital video recorders, digital video players, storage constituting data centers, one of various electronic devices constituting a home network, one of various electronic devices constituting a computer network, one of various electronic devices constituting a telematics network, an RFID (Radio Frequency Identification) device, and a mobile device (e.g., a vehicle, a robot, a drone) capable of human-controlled driving or autonomous driving.

The host may include at least one operating system. The operating system may manage and control overall functions and operations of the host and provide operations between the host and the storage device 100. The operating system may be divided into a general operating system and a mobile operating system depending on the mobility of the host.

In some implementations, the controller 120 and the host may be integrated into a single integrated device. In some implementations, the controller 120 and the host may be separate devices, as will be discussed below.

Referring to FIG. 1, the controller 120 may include a memory interface 122 and a control circuit 123, and may further include a host interface 121.

The host interface 121 provides an interface for communication with the host. For example, the host interface 121 may provide an interface using at least one of an universal serial bus (USB) protocol, a multimedia card (MMC) protocol, a peripheral component interconnection (PCI) protocol, a PCI-express (PCI-E) protocol, and an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, and a private protocol.

In some implementations, upon receiving a command from the host, the control circuit 123 may receive the command through the host interface 121 and perform one or more operations, for example, to process the received command.

The memory interface 122 may be connected to the memory 110 to provide an interface for communication between the memory 110 and another component or device. The memory interface 122 may be configured to provide an interface between the memory 110 and the controller 120 in response to one or more control signals of the control circuit 123.

The control circuit 123 may control the operation of the memory 110 by performing overall control operations of the controller 120. For example, the control circuit 123 may include at least one of a processor 124 or a working memory 125, and may optionally include an error detection and correction circuit (ECC Circuit, 126) or others.

The processor 124 may control overall operations of the controller 120 and perform logical operations. The processor 124 may communicate with the host through the host interface 121 and may communicate with the memory 110 through the memory interface 122.

The processor 124 may perform a function of a flash translation layer (FTL). The processor 124 may convert a logical block address (LBA) provided by the host into a physical block address (PBA) through a flash translation layer (FTL). The flash translation layer (FTL) may receive a logical block address (LBA) by using a mapping table and convert it into a physical block address (PBA).

In some implementations, the flash translation layer may perform an address mapping operation according to mapping units. Example methods of the address mapping operation may include a page mapping method, a block mapping method, and a mixed mapping method.

The processor 124 may randomize data received from the host. For example, the processor 124 may randomize data received from the host using a randomizing seed. The randomized data may be provided to the memory 110 and stored, programmed, or written into a memory cell array of the memory 110.

The processor 124 may derandomize data received from the memory 110 during a read operation. For example, the processor 124 may derandomize data received from the memory 110 using a derandomizing seed. The derandomized data may be output to the host.

The processor 124 may control the operation of the controller 120 by performing firmware operations. The processor 124 may perform operations of firmware loaded into the working memory 125 during a booting process in order to control the overall operation of the controller 120 and perform logical operations. In some implementations, an operation of the storage device 100 may include performing, by the processor 124, an operation of firmware corresponding to the operation of the storage device 100.

In some implementations, firmware may include a program or machine instructions that allow the processor 124 in the storage device 100 to function and communicate with other software running on the storage device or other components inside or outside the storage device 100. In some implementations, firmware may include various functional layers. For example, the firmware may include binary data that defines codes for executing the functional layers.

For example, the firmware may include at least one of a flash translation layer (FTL), a host interface layer (HIL), or a flash interface layer (FIL). In some implementations, the flash translation layer (FTL) may be configured to perform an address mapping or conversion function between a logical address requested by the host and a physical address of the memory 110. In some implementations, the host interface layer (HIL) may be configured to interpret a command requested by the host to the storage device 100 and delivering it to a flash translation layer (FTL). In some implementations, the flash interface layer (FIL) may be configured to transfer commands instructed by the flash translation layer (FTL) to the memory 110.

In some implementations, such firmware may be loaded into the working memory 125 from the memory 110 or from a separate memory (e.g., ROM, NOR Flash) located outside the memory 110. When executing a booting operation after a power-on or power-up procedure, the processor 124 may load all or part of the firmware into the working memory 125.

The processor 124 may perform logic operations defined in firmware loaded in the working memory 125 to control the overall operation of the controller 120. The processor 124 may store a result obtained by performing a logic operation defined in the firmware on the working memory 125. The processor 124 may control the controller 120 to generate a command or signal according to the result discussed above. If part of the firmware defining the logic operation to be performed is not loaded in the working memory 125, an event (e.g., interrupt) can be created to load the corresponding part of the firmware into the working memory 125.

In some implementations, the processor 124 may receive meta data for running the firmware from the memory 110, may load the meta data. In one example, meta data may be used to manage the memory 110 and may include management information about user data stored in the memory 110.

In some implementations, the firmware may be updated when the storage device 100 is produced or while the storage device 100 is running. The controller 120 may download new firmware from the outside of the storage device 100 and update the existing firmware to the new firmware.

The working memory 125 may store firmware, program codes, commands, or data required to operate the controller 120. The working memory 125 may include one or more volatile memory devices, such as static RAM (SRAM), dynamic RAM (DRAM), and synchronous DRAM (SDRAM).

The error detection and correction circuit 126 may detect one or more error bits in target data using an error correction code and correct the detected error bit. The target data may be, for example, data stored in the working memory 125 or data read from the memory 110.

The error detection and correction circuit 126 may be implemented to decode data with an error correction code. The error detection and correction circuit 126 may include one or more code decoders. For example, a decoder performing non-systematic code decoding or a decoder performing systematic code decoding may be used.

For example, the error detection and correction circuit 126 may detect an error bit on a sector basis where a sector is set for each of the read data. Each read data may include a plurality of sectors. A sector may refer to a data unit smaller than a page, which is a read unit of a flash memory. Sectors constituting each read data may correspond to each other by using an address.

The error detection and correction circuit 126 may calculate a bit error rate (BER) and determine the possibility of correction on a sector basis. For example, the error detection and correction circuit 126 may determine that the corresponding sector includes an uncorrectable error or is failed if the bit error rate is higher than a preset reference value. On the other hand, if the bit error rate is lower than the reference value, the corresponding sector may be determined to be correctable or labeled as "pass."

The error detection and correction circuit 126 may sequentially perform error detection and correction operations on all read data. If a sector included in read data is correctable, the error detection and correction circuit 126 may skip an error detection and correction operation for a corresponding sector for the next read data. If the error detection and correction operations for all read data are completed in this way, the error detection and correction circuit 126 may detect "uncorrectable." The number of sectors determined to be uncorrectable may be one or more. The error detection and correction circuit 126 may transfer information (e.g., address information) on a sector determined to be uncorrectable to the processor 124.

A bus 127 may be configured to provide a communication channel that carries electrical signals between components 121, 122, 124, 125, and 126 of controller 120. The bus 127 may include, for example, a control bus for transferring control signals and/or commands, and a data bus for transferring data.

In some implementations, the storage device 100 may be implemented without some of the above-described components 121, 122, 124, 125, and 126 of the controller 120. In some implementations, some of the above-described components 121, 122, 124, 125 and 126 may be integrated into a single component. In some implementations, one or more additional components may be added to the controller 120.

In addition, the storage device 100 may include a circuit located inside or outside the memory 110 or the controller 120 and controlling a voltage supplied to the memory 110 or the controller 120.

Figure 2:
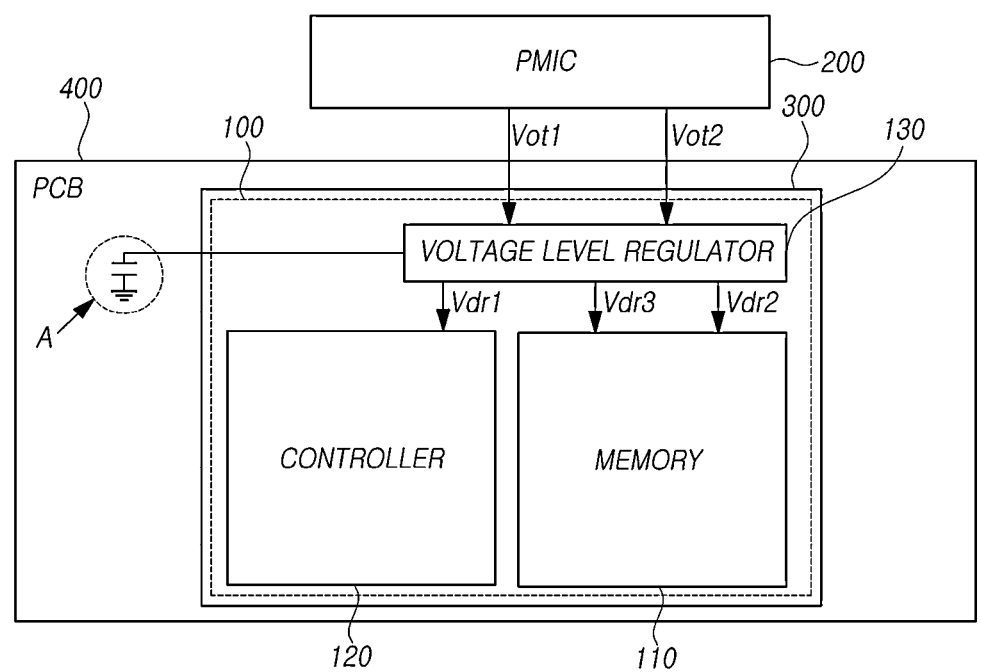
FIG. 2 schematically illustrates an example of how power is supplied to a memory and a controller included in a storage device based on some embodiments of the disclosed technology.

FIG. 2 schematically illustrates an example of how power is supplied to a memory 110 and a controller 120 included in a storage device 100 based on some embodiments of the disclosed technology.

Referring to FIG. 2, a storage device 100 based on some embodiments may include a memory 110 and a controller 120. The storage device 100 may further include a voltage level regulator 130 for adjusting voltages supplied to the memory 110 and the controller 120.

The memory 110, the controller 120 and the voltage level regulator 130 of the storage device 100 may configure a semiconductor device 300. In some embodiments of the disclosed technology, the semiconductor device 300 may be a semiconductor package. In some cases, the storage device 100 may include a memory 110 and a controller 120, and the voltage level regulator 130 may be located outside the storage device 100. The voltage level regulator 130 may be located inside or outside the storage device 100 and constitute the semiconductor device 300 together with the memory 110 and the controller 120.

The semiconductor device 300 may be mounted on the circuit board 400.

The semiconductor device 300 may be electrically connected to a signal line on the circuit board 400 to receive various control signals or power through the corresponding signal line. The semiconductor device 300 may be electrically connected to circuit elements on the circuit board 400 in some cases.

In some implementations, the circuit board 400 and the semiconductor device 300 mounted on the circuit board 400 and including the storage device 100 may be referred to as a "storage system."

The storage device 100 constituting the semiconductor device 300 may receive power from an external power management integrated circuit 200. The power management integrated circuit 200 may, for example, be located in a host located outside the storage device 100, but the disclosed technology is not limited thereto.

The power management integrated circuit 200 may output at least one external voltage.

For example, the power management integrated circuit 200 may output a first external voltage Vot1 and a second external voltage Vot2. The level of the first external voltage Vot1 may be different from the level of the second external voltage Vot2, and for example, the level of the second external voltage Vot2 may be higher than the level of the first external voltage Vot1. Alternatively, the power management integrated circuit 200 may provide only one external voltage (e.g., the first external voltage Vot1).

The first external voltage Vot1 and the second external voltage Vot2 output from the power management integrated circuit 200 may be input to the voltage level regulator 130 located in the semiconductor device 300.

The voltage level regulator 130 may output at least one driving voltage obtained by adjusting the levels of the first external voltage Vot1 and the second external voltage Vot2 input from the power management integrated circuit 200. The voltage level regulator 130 may supply at least one driving voltage to at least one of the memory 110 or the controller 120 of the storage device 100.

For example, the voltage level regulator 130 may output a first driving voltage Vdr1 obtained by lowering the level of the first external voltage Vot1 to the controller 120. The first driving voltage Vdr1 may be a voltage at a level used for internal operation and driving of the controller 120.

The voltage level regulator 130 may output a second driving voltage Vdr2 obtained by increasing the level of the second external voltage Vot2 to the memory 110. The second driving voltage Vdr2 may be a voltage at a level used to operate internal components of the memory 110.

In some implementations, the voltage level regulator 130 may output a third driving voltage Vdr3 obtained by lowering the level of the second external voltage Vot2 to the memory 110. The third driving voltage Vdr3 may be a voltage at a level for an internal operation of the memory 110 for purposes different from the second driving voltage Vdr2.

In some cases, the voltage level regulator 130 may output the third driving voltage Vdr3 obtained by increasing the level of the first external voltage Vot1 to the memory 110.

In some implementations, the second external voltage Vot2 may be directly transmitted to the memory 110. In this case, the second external voltage Vot2 and the second driving voltage Vdr2 obtained by increasing the level of the second external voltage Vot2 may be supplied to the memory 110. In some implementations, the voltage level regulator 130 may output the first driving voltage Vdr1, the second driving voltage Vdr2 and the third driving voltage Vdr3 using one external voltage selected from the first external voltage Vot1 and the second external voltage Vot2.

The level of the external voltage by the power management integrated circuit 200 may be adjusted by the voltage level regulator 130 and supplied to the memory 110 and the controller 120. Therefore, even if the level of the voltage output by the power management integrated circuit 200 and the level of the voltage required for the operation of the storage device 100 are different, it is possible to easily supply the voltage at a level for operating the storage device 100.

In addition, since the voltage level regulator 130 is located outside the memory 110 and the controller 120, the voltage level regulator 130 may include at least one switching element and at least one circuit element other than the switching element and may be disposed in the semiconductor device 300. The voltage level regulator 130 is located outside the memory 110 and the controller 120 and is disposed in a form including a switching element, thereby improving the use efficiency of an external voltage supplied from the outside.

In addition, the voltage level regulator 130 may be located outside the memory 110 and the controller 120 in the semiconductor device 300, and may be electrically connected to circuit elements disposed on the circuit board 400 outside the semiconductor device 300.

In some implementations, as shown in FIG. 2, a part (A) of the voltage level regulator 130 may be a circuit element such as a capacitor disposed on the circuit board 400.

In this case, some circuit elements of the voltage level regulator 130 may be located on the semiconductor device 300, and some other circuit elements such as capacitors may be located on the circuit board 400. Accordingly, there may be facilitated the implementation of the voltage level regulator 130 on the semiconductor device 300.

The voltage level regulator 130 may be physically separated from the memory 110 and the controller 120 in the semiconductor device 300. Alternatively, the voltage level regulator 130 may be configured separately from the memory 110 and the controller 120 in the semiconductor device 300 and integrally formed with the memory 110 or the controller 120.

The voltage level regulator 130 may provide a driving voltage supplied to at least one of the memory 110 and the controller 120. In the case that the voltage level regulator 130 does not supply a driving voltage to either the memory 110 or the controller 120, the memory 110 or the controller 120 may include an internal component for adjusting the level of the external voltage to a voltage level required for operation.

Figure 3:
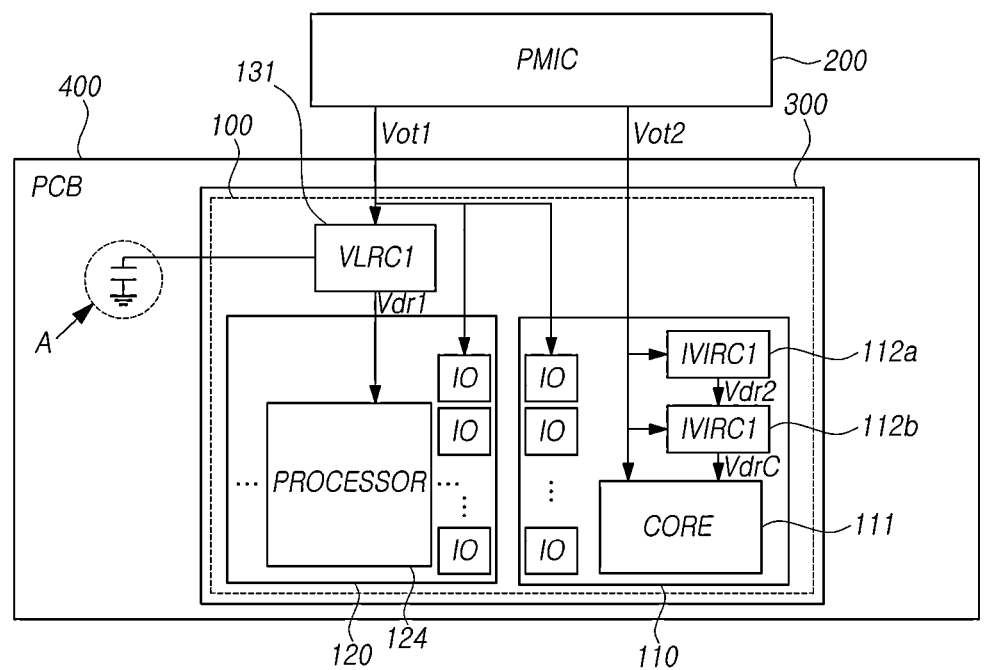
FIG. 3 illustrates an example of how power is supplied to a memory and a controller included in a storage device based on some embodiments of the disclosed technology.
Figure 4:
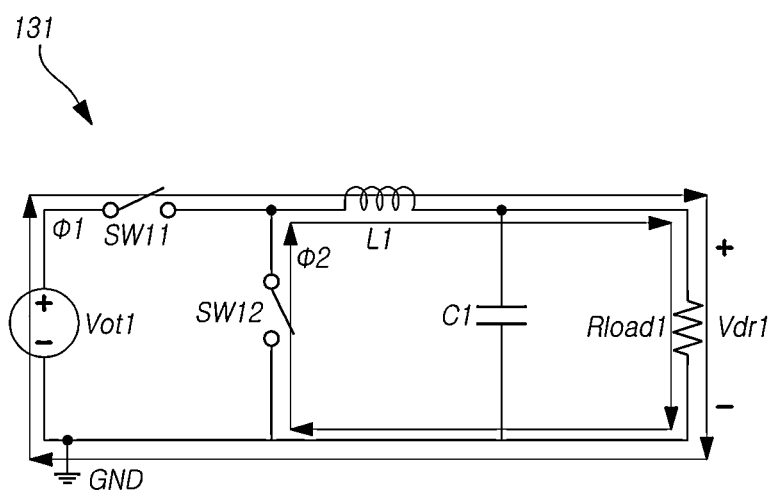
FIG. 4 illustrates an example structure of a first voltage level regulation circuit shown in FIG. 3.
Figure 5:
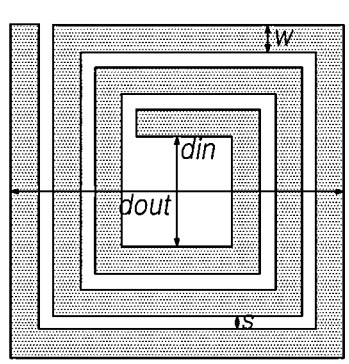
FIG. 5 illustrates example structures of an inductor included in the first voltage level regulation circuit shown in FIG. 4.
Figure 5:
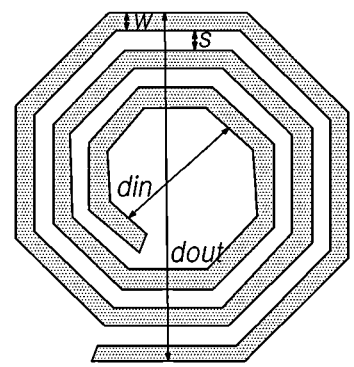
Figure 5:
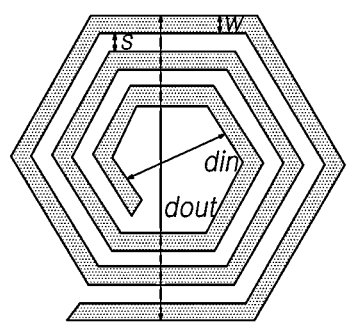
Figure 5:
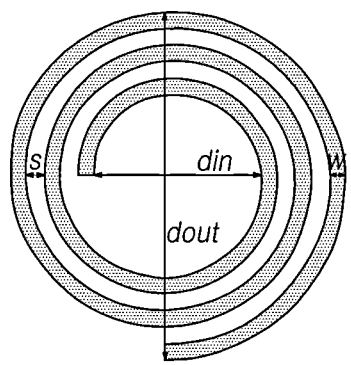

FIG. 3 illustrates an example of how power is supplied to a memory 110 and a controller 120 included in a storage device 100 based on some embodiments of the disclosed technology. FIG. 4 illustrates an example structure of a first voltage level regulation circuit 131 shown in FIG. 3. FIG. 5 illustrates example structures of an inductor included in the first voltage level regulation circuit 131 shown in FIG. 4.

Referring to FIG. 3, a memory 110 and a controller 120 may be disposed on a semiconductor device 300.

In the semiconductor device 300, a first voltage level regulation circuit 131 may be disposed outside the memory 110 and the controller 120. FIG. 3 illustrates an example where the voltage level regulator 130 is configured with the first voltage level regulation circuit 131.

The first voltage level regulation circuit 131 may output a first driving voltage Vdr1 by adjusting a level of the first external voltage Vot1 output by a power management integrated circuit 200. The level of the first driving voltage Vdr1 may be, for example, lower than the level of the first external voltage Vot1.

The first voltage level regulation circuit 131 may provide the controller 120 with the first driving voltage Vdr1 obtained by lowering the level of the first external voltage Vot1.

The first driving voltage Vdr1 may be a voltage at a level used to operate an internal component such as the processor 124 included in the controller 120. The controller 120 may perform an operation of the internal components such as the processor 124 using the first driving voltage Vdr1.

In some implementations, the first external voltage Vot1 may be directly input to the controller 120 or the memory 110. For example, the first external voltage Vot1 may be directly input to the controller 120 through a path different from that of the first voltage level regulation circuit 131. In addition, the first external voltage Vot1 may be directly input into the memory 110. The first external voltage Vot1 may be, for example, a voltage at a level used for transmission and reception of input/output signals between the controller 120 and the memory 110.

The level of the first external voltage Vot1 may be lowered or be down-regulated by the first voltage level regulation circuit 131 and supplied to the controller 120. Therefore, the controller 120 may be supplied with a voltage level required for the operation of the controller 120 without including a component for adjusting the voltage therein.

In some implementations, a part of the first external voltage Vot1 is directly input to the memory 110 or the controller 120 through a path different from the first voltage level regulation circuit 131, and may be used as a voltage for operating the memory 110 and the controller 120.

In the case that the voltage level regulator 130 includes the first voltage level regulation circuit 131, the memory 110 may include a circuit for adjusting the level of an external voltage therein.

For example, the memory 110 may include a first internal voltage increase regulation circuit 112a and a second internal voltage increase regulation circuit 112b.

The first internal voltage increase regulation circuit 112a may receive a second external voltage Vot2 output by the power management integrated circuit 200. The first internal voltage increase regulation circuit 112a may output a second driving voltage Vdr2 obtained by increasing the level of the second external voltage Vot2.

The second internal voltage increase regulation circuit 112b may output a core driving voltage VdrC obtained by increasing the level of the second driving voltage Vdr2 output by the first internal voltage increase regulation circuit 112a.

The core driving voltage VdrC output by the second internal voltage increase regulation circuit 112b may be supplied to a core cell 111 included in the memory 110. The core cell 111 may mean a plurality of memory cells included in the memory 110.

The core driving voltage VdrC may be a voltage having very high level required for the operation of the core cell 111 of the memory 110.

The second external voltage Vot2 may be supplied to the first internal voltage increase regulation circuit 112a in the memory 110, and may also be supplied to the core cell 111.

The core driving voltage VdrC in which the second external voltage Vot2 is supplied to the core cell 111 through the first internal voltage increase regulation circuit 112a and the second internal voltage increase regulation circuit 112b may be used as a voltage for the operation of the cell 111.

The second external voltage Vot2 directly input to the core cell 111 may be used as a level voltage for transmitting and receiving data within the memory 110, for example.

Since a part of the second external voltage Vot2 is directly supplied to the core cell 111 and the other part is supplied to the core cell 111 through at least one internal voltage increase regulation circuit, it is possible to supply all of the voltages at a level used for the operation of the core cell 111 and a level used for data transmission and reception for the operation thereof.

At least one switching element of the first internal voltage increase regulation circuit 112a and the second internal voltage increase regulation circuit 112b may not include a switching element. At least one of the first internal voltage increase regulation circuit 112a and the second internal voltage increase regulation circuit 112b may be a pump integrated circuit.

Accordingly, in the case that the first voltage level regulation circuit 131 is disposed in the semiconductor device 300, there may provide with the voltage of a level required for the operation of the memory 110 by disposing the first internal voltage increase regulation circuit 112a and a second internal voltage increase regulation circuit 112b inside the memory 110.

The first voltage level regulation circuit 131 may include two or more circuit elements located outside the controller 120 and including a switching element. In some cases, some of the circuit elements constituting the first voltage level regulation circuit 131 may be located outside the semiconductor device 300.

For example, referring to FIGS. 3 and 4, the first voltage level regulation circuit 131 may be a buck converter. The first voltage level regulation circuit 131 may include a first switch SW11, a second switch SW12, a first inductor L1, a first capacitor C1, and a first load resistor Rload1.

The first switch SW11 may be electrically connected between an input terminal of the first external voltage Vot1 and the first inductor L1.

The second switching SW12 may be electrically connected between a node between the first switch SW11 and the first inductor L1 and the ground GND.

The first inductor L1 may be electrically connected to a node between the first switch SW11 and the second switch SW12 and a node between the first capacitor C1 and the first load resistor Rload1.

The first capacitor C1 may be electrically connected between a node between the first inductor L1 and the first load resistor Rload1 and the ground GND.

The first load resistor Rload1 may be electrically connected between a node between the first inductor L1 and the first capacitor C1 and the ground GND.

The first switch SW11 and the second switch SW12, for example, may operate in different periods. A period during which the first switch SW11 is turned on may be different from a period during which the second switch SW12 is turned on. For example, the first switch SW11 and the second switch SW12 may be alternately turned on.

The second switch SW12 may be turned off in a period in which the first switch SW11 is turned on.

In the period in which the first switch SW11 is turned on, the current may flow in a direction Φ1 and energy may be stored in the first inductor L1.

Thereafter, the first switch SW11 may be turned off and the second switch SW12 may be turned on.

During the period in which the second switch SW12 is turned on, there may flow the current in a direction Φ2. In this case, the energy stored in the first inductor L1 may be discharged by the first load resistor Rload1.

The first driving voltage Vdr1 obtained by lowering the level of the first external voltage Vot1 may be output.

At least one of the circuit elements included in the first voltage level regulation circuit 131 may be located outside the semiconductor device 300.

For example, referring to FIGS. 3 and 4, the first voltage level regulation circuit 131, as indicated by A in FIG. 3, may be configured using a capacitor located outside the semiconductor device 300, and this capacitor may be the first capacitor C1 of the first voltage level regulation circuit 131.

Other circuit elements included in the first voltage level regulation circuit 131 may be disposed on the semiconductor device 300. For example, the first switch SW11, the second switch SW12, the first inductor L1 and the first load resistor Rload1 may be located on the semiconductor device 300.

The circuit elements of the first voltage level regulation circuit 131 disposed on the semiconductor device 300 may be arranged in a form that can adjust the level of the first external voltage Vot1 to the level of the first driving voltage Vdr1.

For example, FIG. 5 illustrates examples of the configurations of the first inductor L1 included in the first voltage level regulation circuit 131.

The first inductor L1 may be arranged in a quadrangular, hexagonal, octagonal or circular shape, but the disclosed technology is not limited thereto.

The width w, spacing s, inner diameter din, and outer diameter dout of the first inductor L1 may be set according to a degree for adjusting the level of the first external voltage Vot1 by the first inductor L1.

The first inductor L1 may be implemented in various shapes, and may be arranged to have a suitable width w, spacing s, inner diameter din, and outer diameter (dout) according to each shape. Accordingly, the first voltage level regulation circuit 131 may have a shape and size that can minimize an area for arranging the circuit elements of the first voltage level regulation circuit 131 such as the first inductor L1 on the semiconductor device 300.

In addition, a circuit for adjusting a level of a voltage supplied from the semiconductor device 300 to the memory 110 may be disposed outside the memory 110.

Figure 6:
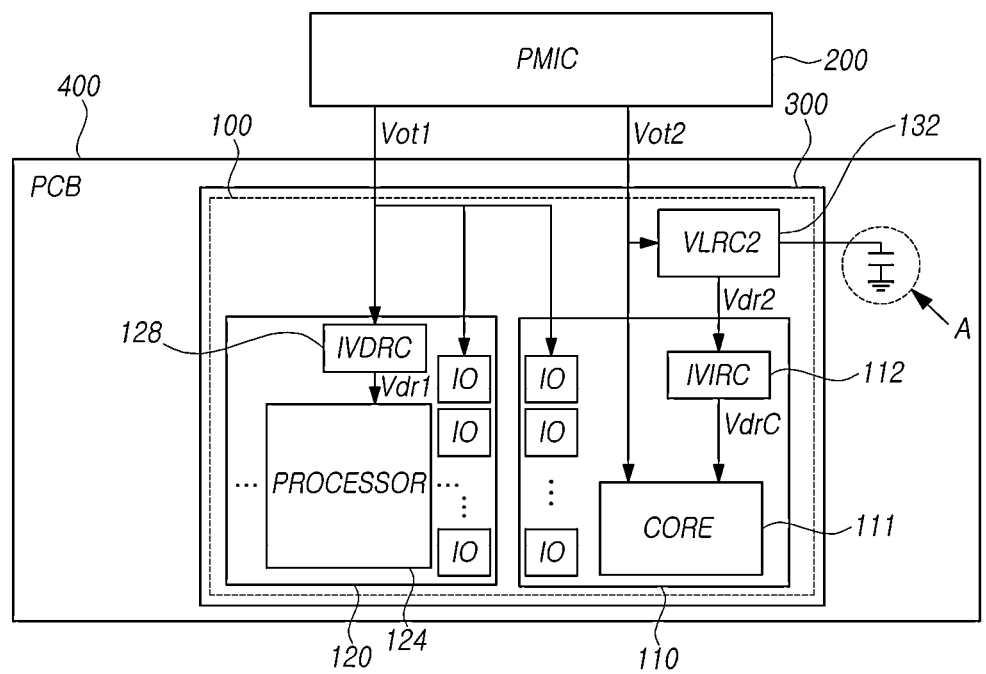
FIG. 6 illustrates an example of how power is supplied to a memory and a controller included in a storage device based on some embodiments of the disclosed technology.
Figure 7:
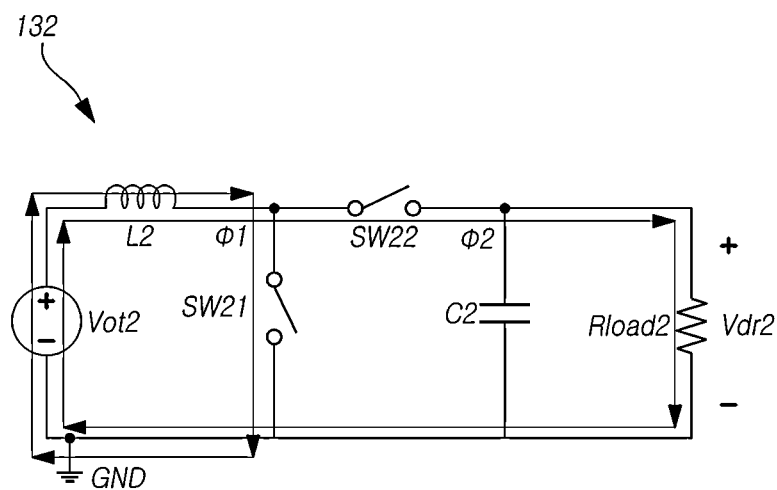
FIG. 7 illustrates an example structure of a second voltage level regulation circuit shown in FIG. 6.

FIG. 6 illustrates an example of how power is supplied to a memory 110 and a controller 120 included in a storage device 100 based on some embodiments of the disclosed technology. FIG. 7 illustrates an example structure of a second voltage level regulation circuit 132 shown in FIG. 6.

Referring to FIG. 6, a memory 110 and a controller 120 may be disposed on a semiconductor device 300.

A second voltage level regulation circuit 132 may be disposed in the semiconductor device 300. The second voltage level regulation circuit 132 may be located outside the memory 110 and the controller 120. FIG. 6 illustrates an example where the voltage level regulator 130 is configured to include the second voltage level regulation circuit 132.

The second voltage level regulation circuit 132 may adjust the level of a second external voltage Vot2 output by the power management integrated circuit 200 and output a second driving voltage Vdr2. The level of the second driving voltage Vdr2 may be higher than the level of the second external voltage Vot2, for example.

The second voltage level regulation circuit 132 may provide the second driving voltage Vdr2 obtained by increasing the level of the second external voltage Vot2 to the memory 110.

The memory 110 may include a core cell 111 and an internal voltage increase regulation circuit 112.

The internal voltage increase regulation circuit 112 may receive the second driving voltage Vdr2 output by the second voltage level regulation circuit 132. The internal voltage increase regulation circuit 112 may output a core driving voltage VdrC obtained by increasing the level of the second driving voltage Vdr2.

The core driving voltage VdrC may be, for example, at a higher level than the second external voltage Vot2. Accordingly, there may be provided the core driving voltage VdrC gradually increased by the second voltage level regulation circuit 132 located outside the memory 110 and the internal voltage increase regulation circuit 112 located inside the memory 110.

The core driving voltage VdrC, which has been increased by the internal voltage increase regulation circuit 112, may be supplied to the core cell 111.

The second external voltage Vot2 may be input to the memory 110 through a path different from the second voltage level regulation circuit 132.

The core driving voltage VdrC, which is increased by the internal voltage increase regulation circuit 112, may be used as a voltage for driving the core cell 111. The second external voltage Vot2 directly input to the memory 110 may be used as a voltage for transmission and reception of internal data or signals for operation of the memory 110.

The memory 110 may operate by using the second external voltage Vot2 directly input from the power management integrated circuit 200 and the core driving voltage VdrC adjusted by the second voltage level regulation circuit 132 and the internal voltage increase regulation circuit 112.

In the case that the voltage level regulator 130 includes only the second voltage level regulation circuit 132, a configuration for outputting a voltage of a level required for the operation of the controller 120 may be disposed inside the controller 120.

For example, an internal voltage decreasing regulation circuit 128 may be disposed inside the controller 120.

The internal voltage decreasing regulation circuit 128 may receive a first external voltage Vot1 output by the power management integrated circuit 200. The internal voltage decreasing regulation circuit 128 may supply a first driving voltage Vdr1 obtained by lowering the level of the first external voltage Vot1 to various components such as the processor 124 included in the controller 120.

The internal voltage decreasing regulation circuit 128 may, for example, not include a switching element. The internal voltage decreasing regulation circuit 128 may be, for example, a low drop-out (LDO) regulator, but the disclosed technology is not limited thereto.

In the case that the voltage level regulator 130 includes the second voltage level regulation circuit 132, an internal voltage decreasing regulation circuit 128 may be disposed inside the controller 120 so as to provide the voltage required for the operation of the controller 120.

The second voltage level regulation circuit 132 may be located outside the memory 110 and may include two or more circuit elements including a switching element. In addition, at least one of the circuit elements included in the second voltage level regulation circuit 132 may be located outside the semiconductor device 300 in some cases.

Referring to FIGS. 6 and 7, the second voltage level regulation circuit 132 may be, for example, a boost converter. The second voltage level regulation circuit 132 may include a first switch SW21, a second switch SW22, a second inductor L2, a second capacitor C2, and a second load resistor Rload2.

The first switch SW21 may be electrically connected between a node between the second inductor L2 and the second switch SW22 and the ground GND.

The second switch SW22 may be electrically connected between a node between the second inductor L2 and the first switch SW21 and a node between the second capacitor C2 and the second load resistor Rload2.

The second inductor L2 may be electrically connected between a node between the first switch SW21 and the second switch SW22 and an input terminal of the second external voltage Vot2.

The second capacitor C2 may be electrically connected between a node between the second switch SW22 and the second load resistor Rload2 and the ground GND.

The second load resistor Rload2 may be electrically connected between a node between the second switch SW22 and the second capacitor C2 and the ground GND.

The second switch SW22 may be turned off while the first switch SW21 is turned on. When the first switch SW21 is turned on, current may flow along the direction of ϕ1. Since the resistor is not located in the path through which the current flows, the second inductor L2 can be charged.

The first switch SW21 may be turned off and the second switch SW22 may be turned on.

In a period in which the second switch SW22 is turned on, the current charged in the second inductor L2 may be discharged, and a voltage higher than the input voltage may be generated. A second driving voltage Vdr2 higher than the second external voltage Vot2 may be output.

At least one of the circuit elements included in the second voltage level regulation circuit 132 may be located outside the semiconductor device 300 in some cases. For example, the second voltage level regulation circuit 132 may be implemented using a capacitor positioned on the circuit board 400 outside the semiconductor device 300, as indicated by A in FIG. 6. The capacitor located on the circuit board 400 may be the second capacitor C2 included in the second voltage level regulation circuit 132.

The remaining circuit elements included in the second voltage level regulation circuit 132 may be disposed on the semiconductor device 300.

The second inductor L2 included in the second voltage level regulation circuit 132 may be arranged in a shape and size according to the level of the voltage level to be increased by the second voltage level regulation circuit 132. For example, the second inductor L2 may be disposed in one of the examples described above with reference to FIG. 5.

Accordingly, since the first voltage level regulation circuit 131 or the second voltage level regulation circuit 132 is disposed on the semiconductor device 300 to adjust the external voltage to the driving voltage of the level required by the controller 120 or the memory 110, the disclosed technology can be implemented in some embodiments to provide the voltage of a level required for the operation of the storage device 100.

In addition, two or more voltage level regulation circuits may be disposed on the semiconductor device 300 to provide voltage levels required for the operation of the controller 120 and the memory 110.

Figure 8:
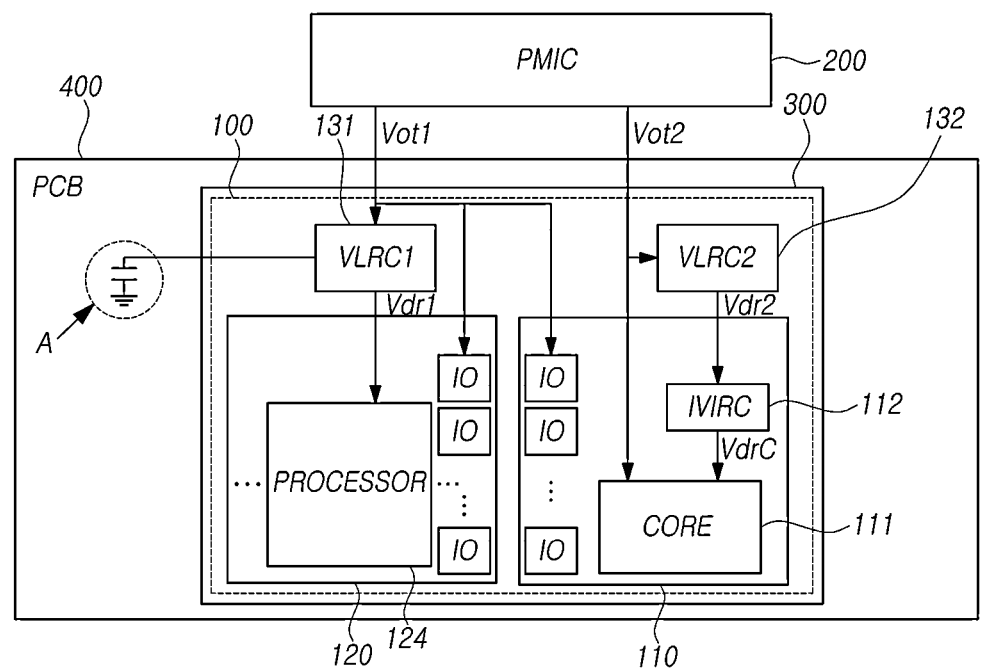
FIGS. 8 to 10 illustrate examples of how power is supplied to a memory and a controller included in a storage device based on some embodiments of the disclosed technology.
Figure 9:
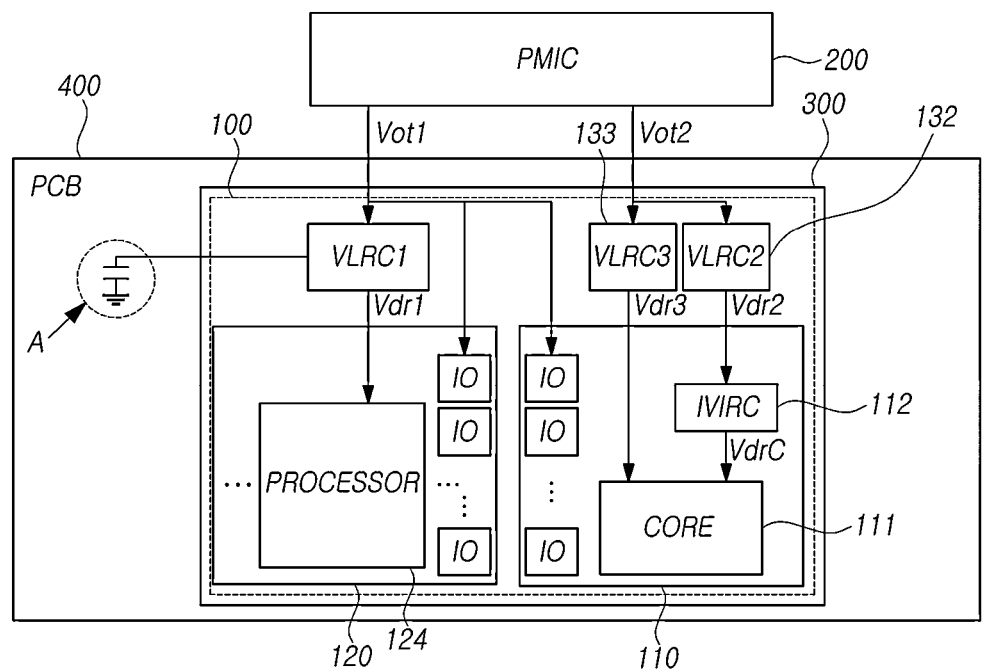
Figure 10:
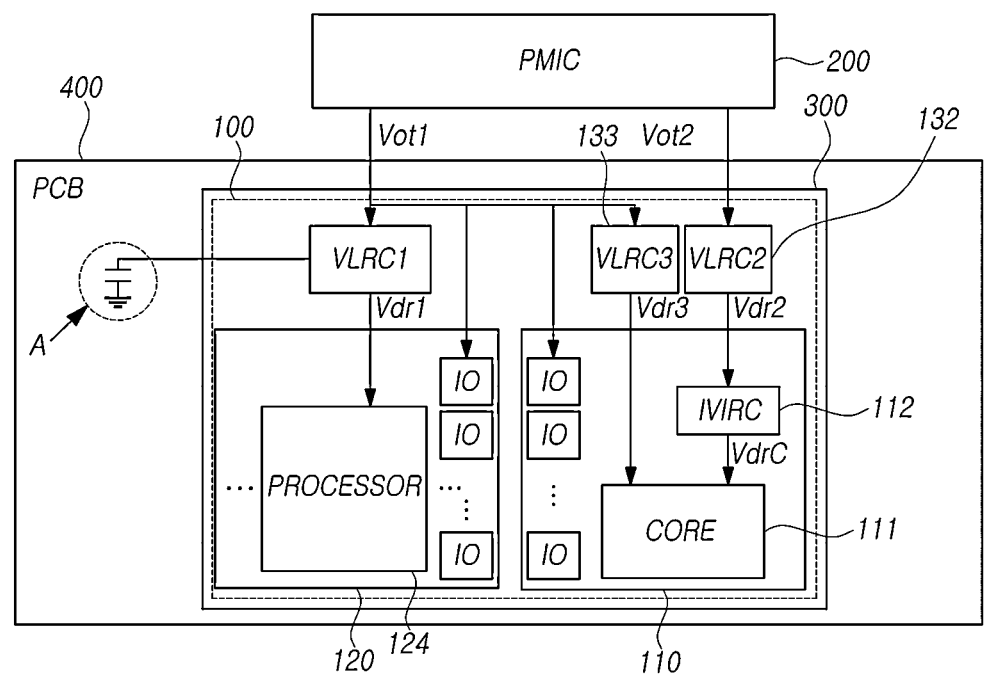

FIGS. 8 to 10 illustrate other examples of a structure for supplying power to a memory 110 and a controller 120 included in a storage device 100 based on some embodiments of the disclosed technology.

Referring to FIG. 8, a memory 110, a controller 120, a first voltage level regulation circuit 131 and a second voltage level regulation circuit 132 may be disposed in a semiconductor device 300.

The first voltage level regulation circuit 131 may provide the first driving voltage Vdr1 obtained by lowering the level of the first external voltage Vot1 output by the power management integrated circuit 200 to the controller 120.

The first external voltage Vot1 may be provided to the first voltage level regulation circuit 131, and in some cases, may be directly input to the controller 120 and the memory 110 through a path different from that of the first voltage level regulation circuit 131.

The second voltage level regulation circuit 132 may provide the second driving voltage Vdr2 obtained by increasing the level of the second external voltage Vot2 output by the power management integrated circuit 200 to the memory 110.

The second driving voltage Vdr2 output by the second voltage level regulation circuit 132 may be increased by the internal voltage increase regulation circuit 112 included in the memory 110. A core driving voltage VdrC, which is increased by the internal voltage increase regulation circuit 112, may be supplied to a core cell 111 of the memory 110.

The second external voltage Vot2 is provided to the second voltage level regulation circuit 132, and, in some cases, may be directly input to the memory 110 through a path different from that of the second voltage level regulation circuit 132.

Based on the first external voltage Vot1 and the second external voltage Vot2 output by the power management integrated circuit 200, the disclosed technology can be implemented in some embodiments to provide the first external voltage Vot1, the second external voltage Vot2, the first driving voltage Vdr1 and the core driving voltage VdrC required for the operation of the memory 110 and the controller 120.

The first voltage level regulation circuit 131 and the second voltage level regulation circuit 132 may include a switching element and may be implemented as a circuit element disposed on the semiconductor device 300.

In some cases, at least one of the first voltage level regulation circuit 131 and the second voltage level regulation circuit 132 may include a circuit element located outside the semiconductor device 300.

For example, the first voltage level regulation circuit 131 may be implemented using a capacitor located on the circuit board 400 outside the semiconductor device 300, as indicated by A in FIG. 8. In this case, the second voltage level regulation circuit 132 may be implemented only with circuit elements disposed on the semiconductor device 300. Alternatively, at least one of the circuit elements constituting the second voltage level regulation circuit 132 may be located on the circuit board 400 outside the semiconductor device 300. In some cases, the second voltage level regulation circuit 132 may be implemented using circuit elements on the circuit board 400, and the first voltage level regulation circuit 131 may be implemented using only circuit elements on the semiconductor device 300.

In addition, the first voltage level regulation circuit 131 and the second voltage level regulation circuit 132 may be separate circuits or, in some cases, the first voltage level regulation circuit 131 and the second voltage level regulation circuit 132 may be integrated into an integrated circuit.

As described above, the first voltage level regulation circuit 131 and the second voltage level regulation circuit 132 including the switching element are located outside the memory 110 and the controller 120 in the semiconductor device 300 to supply a voltage required for the operation of the memory 110 and the controller 120, thereby improving the efficiency of power supplied by the power management integrated circuit 200.

In addition, in some cases, an additional voltage level regulation circuit may be further disposed on the semiconductor device 300.

Referring to FIG. 9, a memory 110, a controller 120, a first voltage level regulation circuit 131, a second voltage level regulation circuit 132, and a third voltage level regulation circuit 133 may be disposed on a semiconductor device 300.

The first voltage level regulation circuit 131 may supply the controller 120 with a first driving voltage Vdr1 obtained by lowering the first external voltage Vot1 output by the power management integrated circuit 200.

The second voltage level regulation circuit 132 may provide the second driving voltage Vdr2 obtained by increasing the level of the second external voltage Vot2 output by the power management integrated circuit 200 to the memory 110.

The third voltage level regulation circuit 133 may provide the third driving voltage Vdr3 obtained by lowering the level of the second external voltage Vot2 output by the power management integrated circuit 200 to the memory 110.

At least one of the first external voltage Vot1 and the second external voltage Vot2 output by the power management integrated circuit 200 may be used as it is by the memory 110 or the controller 120. However, the level of the first external voltage Vot1 and the second external voltage Vot2 may be different from voltage levels required by the memory 110 or the controller 120.

For example, the first external voltage Vot1 may be directly input and used to the memory 110 and the controller 120, but there may be required to adjust the level of the second external voltage Vot2 to be used for purposes other than the core driving voltage VdrC in the memory 110. In this case, the third voltage level regulation circuit 133 may lower the level of the second external voltage Vot2 and supplies it to the memory 110, so that voltages of various levels required for driving the memory 110 can be supplied to the memory 110.

The third voltage level regulation circuit 133 may be, for example, a buck converter, and may have a structure similar to that of the first voltage level regulation circuit 131 described above with reference to FIG. 4.

As in the above example, at least a portion of the first voltage level regulation circuit 131, the second voltage level regulation circuit 132 and the third voltage level regulation circuit 133 may be implemented only with circuit elements located on the semiconductor device 300, or at least some other portions may be implemented by including circuit elements located outside the semiconductor device 300. In this case, the third voltage level regulation circuit 133 may include a circuit element on the circuit board 400 outside the semiconductor device 300.

Alternatively, in some cases, the third voltage level regulation circuit 133 may provide a driving voltage obtained by increasing the external voltage.

Referring to FIG. 10, a first voltage level regulation circuit 131, a second voltage level regulation circuit 132 and a third voltage control circuit 133 may be disposed outside the controller 120 and the memory 110 on the semiconductor device 300.

The first voltage level regulation circuit 131 and the second voltage level regulation circuit 132 may operate in the same manner as the functions described above with reference to FIG. 9.

The third voltage level regulation circuit 133 may provide a third driving voltage Vdr3 obtained by increasing the level of the first external voltage Vot1 output by the power management integrated circuit 200 to the memory 110.

The third voltage level regulation circuit 133 may lower the level of the second external voltage Vot1 to provide to the memory 110, as in the example described with reference to FIG. 9. However, in some cases, the third voltage level regulation circuit 133 may increase the level of the first external voltage Vot1 to provide to the memory 110. In addition, in some cases, the second voltage level regulation circuit 132 may increase the level of the first external voltage Vot1 and provide the second driving voltage Vdr2 to the memory 110. Even if the power management integrated circuit 200 provides only the first external voltage Vot1, the first driving voltage Vdr1, the second driving voltage Vdr2 and the third driving voltage Vdr3 may be provided to the controller 120 and the memory 110 by the first voltage level regulation circuit 131, the second voltage level regulation circuit 132 and the third voltage level regulation circuit 133. In addition, in some cases, even if the power management integrated circuit 200 provides only the second external voltage Vot2, the first driving voltage Vdr1, the second driving voltage Vdr2 and the third driving voltage Vdr3 may be provided based on the second external voltage Vot2.

In the case that the third voltage level regulation circuit 133 increases the level of the first external voltage Vot1 to provides to the memory 110, the third voltage level regulation circuit 133 may be, for example, a boost converter and may have a structure similar to that of the second voltage level regulation circuit 132 described above with reference to FIG. 7.

The third voltage level regulation circuit 133 may be implemented only with circuit elements on the semiconductor device 300, and in some cases, a part of the circuit elements of the third voltage level regulation circuit 133 may be located on the circuit board 400.

Each of the first voltage level regulation circuit 131, the second voltage level regulation circuit 132 and the third voltage level regulation circuit 133 may be separately disposed, or in some cases, at least a part thereof may be arranged in an integrated form.

As described above, based on some embodiments of the disclosed technology, it is possible to easily supply the voltage of the level required for the operation of the memory 110 and the controller 120 by using at least one voltage level regulation circuit, which is located outside the memory 110 and the controller 120 on the semiconductor device 300 and includes a switching element.

Therefore, some embodiments of the disclosed technology can make it possible to easily supply the voltages of various levels required for the operation of the memory 110 and the controller and improve the efficiency of use of the power supplied by the power management integrated circuit 200.

In some embodiments of the disclosed technology described above, the operation delay time of the memory system may be advantageously reduced or minimized. In addition, in some embodiments of the disclosed technology, an overhead occurring in the process of calling a specific function may be advantageously reduced or minimized. Although various embodiments of the disclosed technology have been described with particular specifics and varying details for illustrative purposes, various modifications, additions and substitutions may be made based on what is disclosed or illustrated in this patent document.

What is claimed is:

1. A storage system comprising:
a circuit board;
a semiconductor device coupled to the circuit board and including at least one memory and a controller, wherein the controller is in communication with the at least one memory and configured to control the at least one memory; and
a voltage level regulator coupled to the circuit board and including at least one switching element and located outside the at least one memory and the controller in the semiconductor device, the voltage level regulator configured to output, to at least one of the at least one memory or the controller, a driving voltage obtained by adjusting a level of at least one external voltage received from a device outside the semiconductor device,
wherein the at least one external voltage includes a second external voltage,
wherein the voltage level regulator outputs, to the at least one memory, a second driving voltage obtained by increasing a level of the second external voltage, or the voltage level regulator outputs, to the at least one memory, a third driving voltage obtained by lowering a level of the second external voltage.

2. The storage system of claim 1, wherein the at least one external voltage further includes a first external voltage, wherein the voltage level regulator outputs, to the controller, a first driving voltage obtained by lowering a level of the first external voltage.

3. The storage system of claim 1, wherein the at least one external voltage further includes a first external voltage, wherein the voltage level regulator outputs, to the at least one memory, the third driving voltage obtained by increasing a level of the first external voltage.

4. The storage system of claim 1, wherein the voltage level regulator comprises a second voltage level regulation circuit configured to output, to the at least one memory, the second driving voltage obtained by increasing a level of the second external voltage and including two or more circuit elements other than the at least one switching element.

5. The storage system of claim 4, wherein the two or more circuit elements comprise:
an inductor located on the semiconductor device and electrically connected to the at least one switching element; and
a capacitor located on the circuit board outside the semiconductor device and electrically connected to the at least one switching element.

6. The storage system of claim 4, wherein the at least one external voltage further includes a first external voltage, wherein the controller comprises an internal voltage decreasing regulation circuit configured to output a first driving voltage obtained by lowering a level of the first external voltage.

7. The storage system of claim 4, wherein the at least one memory comprises an internal voltage increase regulation circuit configured to output a core driving voltage obtained by increasing the level of the second driving voltage output from the second voltage level regulation circuit.

8. The storage system of claim 1, wherein the at least one external voltage further includes a first external voltage, wherein the voltage level regulator comprises:
a first voltage level regulation circuit configured to output, to the controller, a first driving voltage obtained by lowering a level of the first external voltage; and
a second voltage level regulation circuit configured to output, to the at least one memory, the second driving voltage obtained by increasing a level of the second external voltage that is higher than the level of the first external voltage.

9. The storage system of claim 8, wherein at least part of the first voltage level regulation circuit is disposed on the semiconductor device, and at least part of the second voltage level regulation circuit is disposed on both the semiconductor device and the circuit board, or wherein the at least part of the second voltage level regulation circuit is disposed on the semiconductor device, and the at least part of the first voltage level regulation circuit is disposed on both the semiconductor device and the circuit board.

10. The storage system of claim 8, wherein the voltage level regulator further comprises a third voltage level regulation circuit configured to output, to the at least one memory, the third driving voltage obtained by increasing the level of the first external voltage or lowering the level of the second external voltage.

11. A storage system comprising:
a circuit board;
a semiconductor device coupled to the circuit board and including at least one memory and a controller, wherein the controller is in communication with the at least one memory and configured to control the at least one memory; and
a voltage level regulator coupled to the circuit board and including at least one switching element and located outside the at least one memory and the controller in the semiconductor device, the voltage level regulator configured to output, to at least one of the at least one memory or the controller, a driving voltage obtained by adjusting a level of at least one external voltage received from a device outside the semiconductor device,
wherein the at least one external voltage includes a first external voltage, wherein the voltage level regulator comprises a first voltage level regulation circuit configured to output, to the controller, a first driving voltage obtained by increasing a level of the first external voltage and including two or more circuit elements other than the at least one switching element.

12. The storage system of claim 11, wherein the two or more circuit elements comprise:
an inductor located on the semiconductor device and electrically connected to the at least one switching element; and
a capacitor located on the circuit board outside the semiconductor device and electrically connected to the at least one switching element.

13. The storage system of claim 11, wherein the at least one external voltage includes a second external voltage, wherein the at least one memory comprises:
a first internal voltage increase regulation circuit configured to output a second driving voltage obtained by increasing a level of the second external voltage; and
a second internal voltage increase regulation circuit configured to output a core driving voltage obtained by increasing the level of the second driving voltage output from the first internal voltage increase regulation circuit.

14. A semiconductor device comprising:
at least one memory;

a controller configured to control the at least one memory; and
a voltage level regulator including at least one switching element and located outside the at least one memory and the controller, the voltage level regulator configured to output, to at least one of the at least one memory or the controller, a driving voltage obtained by adjusting a level of at least one external voltage received from a device outside the semiconductor device,
wherein the at least one external voltage includes a first external voltage and a second external voltage, wherein the voltage level regulator comprises:
a first voltage level regulation circuit located outside the controller and configured to output, to the controller, a first driving voltage obtained by lowering a level of the first external voltage; and
a second voltage level regulation circuit located outside the at least one memory and configured to output, to the at least one memory, a second driving voltage obtained by increasing a level of the second external voltage.

15. The semiconductor device of claim 14, wherein the at least one memory comprises an internal voltage increase regulation circuit configured to output a core driving voltage obtained by increasing the level of the second driving voltage output from the second voltage level regulation circuit.

16. The semiconductor device of claim 14, wherein one of the first voltage level regulation circuit and the second voltage level regulation circuit is electrically connected to an external circuit element.

17. The semiconductor device of claim 14, wherein the second external voltage is directly applied to the at least one memory through a path different from the second voltage level regulation circuit.

* * * * *